Dec. 2, 1958 A. G. MURPHY 2,863,114
METHOD AND APPARATUS FOR MONITORING THE
IGNITION TIMING OF AN INTERNAL
COMBUSTION ENGINE
Filed May 7, 1956 2 Sheets-Sheet 1

INVENTOR.
ARTHUR G. MURPHY
BY
Woodhams Blanchard & Flynn
ATTORNEYS

United States Patent Office 2,863,114
Patented Dec. 2, 1958

2,863,114

METHOD AND APPARATUS FOR MONITORING THE IGNITION TIMING OF AN INTERNAL COMBUSTION ENGINE

Arthur G. Murphy, Pavilion Township, Kalamazoo County, Mich., assignor to Allen Electric and Equipment Company, Kalamazoo, Mich., a corporation of Michigan Application May 7, 1956, Serial No. 583,055

6 Claims. (Cl. 324—16)

This invention relates in general to an apparatus whereby the ignition timing of an internal combustion engine can be accurately determined and its condition of advance or retard easily observed during the normal operation of the engine in an automotive vehicle. Particularly, this invention relates to a portable instrument which may easily be placed in operative connection with a vehicle, if desired within the operator's space within such vehicle, and whereby the ignition timing of the engine in said vehicle can be observed and accurately determined while the vehicle is being operated in an otherwise normal manner.

Certain industries, such as the automotive and oil industries, have had a pressing need for a small, compact and accurate instrument whereby the ignition timing of their test vehicles may be accurately and continuously monitored during test operations. Existing apparatus designed for this general purpose is usually bulky, difficult to install, difficult to adjust, and often relatively inflexible, both in its installation its application.

Accordingly, one primary object of this invention is to provide a method for monitoring the ignition timing of an internal combustion engine which will be accurate and reliable, and which can be carried out by apparatus that is inexpensive to manufacture, inexpensive to maintain and capable of easy application to a wide variety of such engines.

Another object of this invention is the provision of apparatus whereby the amount of advance or retard in the ignition timing of an internal combustion engine can be observed and accurately determined while the engine is operating and the vehicle moving in an otherwise normal manner.

A further object of this invention is the provision of apparatus, as aforesaid, contained in a small, portable unit, which can be easily mounted in the driver's space within a test vehicle containing the engine being tested, said unit being easily dissociated from one test vehicle for use with another test vehicle, and said apparatus being easily and quickly adjusted for, and adapted to, different engine requirements.

A further object of this invention is the provision of an apparatus, as aforesaid, which is extremely rugged in construction and which requires a relatively small amount of power input.

A further object of this invention is the provision of an apparatus, as aforesaid, which utilizes transistors as the valving devices in its circuit.

A further object of the invention has been to provide an apparatus, as aforesaid, which will provide a direct and constant reading indicating the ignition advance or retard condition continuously during all phases of engine operation.

A further object of the invention has been to provide a device, as aforesaid, which can be easily compensated electrically for mechanical inaccuracies of installation and which, accordingly, does not require the mechanical accuracy of installation that is common with presently known apparatus.

A further object of the invention has been to provide a device, as aforesaid, which will be free from delicate parts and which hence will withstand rough usage without materially harming its accuracy.

A further object of the invention has been to provide a device, as aforesaid, which will be capable of connection to an engine in a variety of ways and hence will be extremely versatile in its manner of use.

A further object of the invention has been to provide a device, as aforesaid, which is of sufficient structural simplicity that it will be economical to fabricate.

Other objects and purposes of this invention will become apparent to persons familiar with this type of apparatus upon reading the following specification and examining the accompanying drawings, in which.

*General Description*

Figure 1:
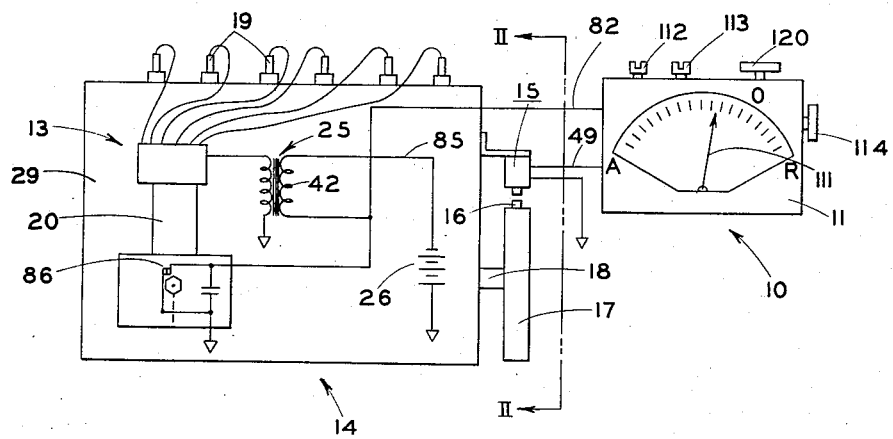
Figure 1 is a partially schematic, side elevation view of an internal combustion engine associated with the apparatus to which this invention relates.
Figure 3:
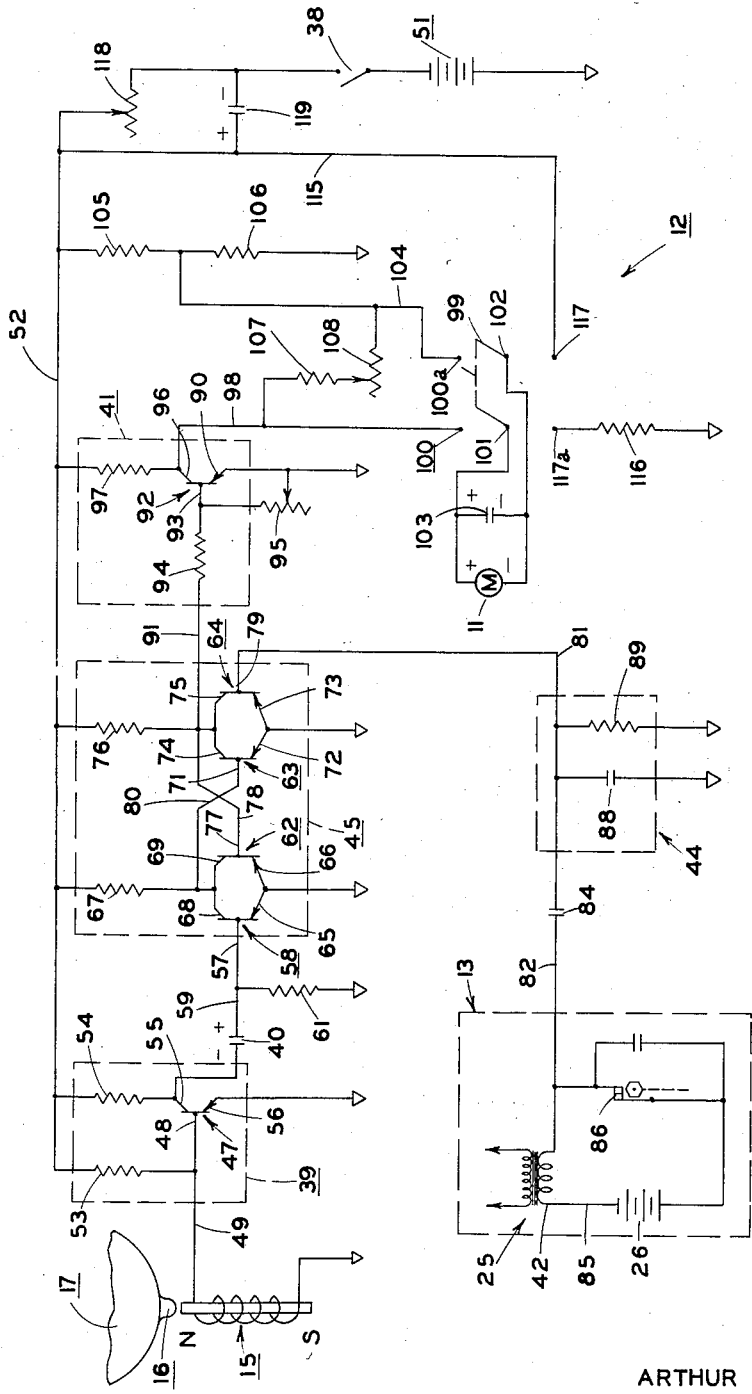
Figure 3 is a diagram of the circuit employed by the apparatus of the invention.

As shown in Figures 1 and 3, the timing test apparatus 10 is comprised of a visible indicator, such as the meter 11, electrically connected by the circuit 12 to the ignition circuit 13 of the engine 14 and to a signal detector 15 mounted upon said engine 14. A signal actuator 16 is mounted upon means, such as the flywheel 17, rotatable with the crankshaft 18 and is designed to energize the detector 15, which is located adjacent to the periphery of the flywheel 17, each time said actuator 16 passes said detector. The actuator 16 and the detector 15 are so located that said passing will cause a pulse to travel from the detector to the circuit 12, but only at a time when the distributor will not transmit energy to one of the spark plugs 19 on the engine 14. Pulses occurring each time the distributor effects a firing of a spark plug are also fed into the circuit 12. For convenience, the circuits feeding these pulses to the circuit 12 may be referred to generally as detector circuits. For more specific designation, the circuit which is energized by the detector 15 may be designated as the "mechanical detector circuit" and the circuit which is energized by the ignition system 13 may be designated as the "ignition detector circuit." The circuit 12 produces an output pulse which is started by a pulse from one of two detector circuits and is stopped by the other one. In this embodiment the circuit of the mechanical detector starts the output pulse and said output pulse is terminated by the next succeeding pulse from the ignition detector circuit. The duration of said output pulse, as compared with the time elapsing between corresponding portions of successive cycles of either control circuit, is indicated by the meter 11, and produces a reading on the meter 11 representing the degrees of advance or retard, as the case may be, in the distributor at the moment such reading is taken.

*Detailed Construction*

Figure 2:
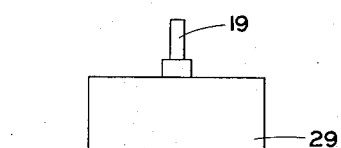
Figure 2 is a front end elevation view of said engine, substantially as viewed along the cutting line II—II of Figure 1.

As indicated in Figures 1 and 2, the engine 14 is disclosed herein for illustrative purposes only as of the six cylinder, in-line type, wherein the spark plugs 19 are successively energized in a conventional manner by an ignition circuit 13 controlled by the distributor 20. Said distributor, in turn, is energized through the spark coil 25 and breaker points 86 by a battery 26 in a conventional manner. As shown in Figure 2, the engine 14 is provided with some sort of timing mark 27 on a part, such as the flywheel 17, which rotates with the crankshaft 18, and a corresponding reference mark 28 on the engine block 29, said marks being aligned at some predetermined and known position of the crankshaft with respect to the engine block. For the purposes of illustration, it will be assumed that the marks 27 and 28 are aligned when cylinder No. 1 in the engine is at top dead center. It will also be assumed, for the purposes of illustration, that the engine 14 is of a conventional type wherein the crankshaft 18 rotates through two complete revolutions in order to fire all six of its cylinders, and that the firing ranges of the spark plugs 19 are divided so that only three plugs are fired during one revolution. Furthermore, the firing ranges of the three plugs which are fired in any one revolution are disposed substantially equidistant from each other, as indicated at 31, 32 and 33 in Figure 2. Again for the sake of illustration, it will be assumed that firing range 31 pertains to cylinder No. 1, which, as shown in Figure 2, is at the moment in top dead center. As is customary in engines of conventional automotive type, the maximum range of firing of a spark plug with respect to its associated cylinder may be varied roughly between a range of approximately 50° in advance of the top dead center position to a position of approximately 10° retard, or following, of the top dead center position of its associated piston, such range being automatically controlled by the distributor and manually adjustable for correction in a conventional manner.

Under the conditions set forth hereinabove for illustration, it will be apparent that the spark plug associated with the cylinder No. 1 of a six cylinder engine will fire at some time when the timing mark 27 is disposed within, or pointing at, the firing range 31. In the next engine revolution, the mark 27 will be pointing at the firing range 31 when the spark plug associated with cylinder No. 4 is fired. Thus, and in the same manner, the spark plugs associated with cylinders No. 2 and No. 5 will fire when the timing mark 27 is pointing to a portion of the firing range 32, and the spark plugs associated with cylinders No. 3 and No. 6 will fire when the timing mark 27 is pointing to a portion of the firing range 33. However, when the timing mark 27 is pointing to a position around the periphery of the flywheel 17 (Figure 2), which is not included within said firing ranges 31, 32 and 33, such as that indicated in broken lines at 34, then, under normal circumstances, no spark plug will fire, regardless of the setting of the distributor 20. The signal actuator 16 and the signal detector 15 are so arranged that the actuator will pass the detector when, and only when, the timing mark 27 is not within any of the firing ranges 31, 32 and 33. The purpose of this arrangement is to eliminate any coincidence in the pulses created by the detector 15 and the firing of a particular spark plug in the distributor 20 for reasons appearing hereinafter.

The test apparatus 10, which is electrically connected both to the ignition control circuit 13 and to the control circuit connected with detector 15, has a meter 11 integral therewith which is calibrated in degrees, ranging as desired but in this embodiment from approximately 50° of advance to approximately 10° of retard, so that the timing of the ignition circuit 13 can be read and observed directly on said meter 11.

The test circuit 12 (Figure 3) is comprised, in general, of a detector 15 for creating an electrical pulse with each engine revolution, a single stage amplifier 39, which receives and amplifies the pulses created by the detector 15 for transmission to the flip-flop circuit 45. The circuit 12 is also connected, in this embodiment, to the primary winding 42 of the coil 25 for receiving pulses from the primary side of the ignition circuit 13 and transmitting them through a voltage divider 44 to said flip-flop circuit 45 each time a spark plug fires. The two sets of pulses from the respective detector circuits are fed to opposite sides of the flip-flop circuit 45, which controls the flow of energy through a single stage amplifier 41 to the meter 11.

In more detail, the detector 15 may be any type of device for producing an electrical pulse in response to passage of the signal actuator 16. For example, said signal detector 15 is here a conventional, magnetic pickup, which generates a pulse each time the signal actuator 16, which in this embodiment is a ferro-magnetic protuberance on the flywheel 17, passes through the flux field of the pick-up or detector 15. The pulse thus created by the detector 15 passes through the conductor 49 to the amplifier 39. The amplifier 39 is comprised of a transistor 47, the base 48 of which is connected by the conductor 49 to the pick-up 15. The conductor 49 is also connected by an input conductor 52 to a source of potential, such as the battery 51, through a biasing resistor 53, which is part of the amplifier 39. A collector load resistor 54 is placed between the conductor 52 and the collector 55 of the transistor 47. A switch 38 is placed in the conductor 52 between the load 54 and the battery 51. The emitter 56 of the transistor 47 is connected to ground.

A coupling condenser 40 is connected between the collector 55 of the transistor 47 and the base 57 of a transistor 58 by the conductor 59. The conductor 59 is connected to ground between the coupling condenser 40 and the base 57 through a biasing resistor 61. The emitters 65 and 66 of the transistors 58 and 62, respectively, are coupled together and connected to ground. The collectors 68 and 69 of the transistors 58 and 62, respectively, are also coupled together and connected through the load resistor 67 to the power input line 52 between the load resistor 54 and the switch 38. The coupled collectors 68 and 69 are also connected by the conductor 80 to the base 71 of the transistor 63. The emitters 72 and 73 of the transistors 63 and 64, respectively, are coupled together and connected to ground. The collectors 74 and 75 are coupled together and connected to the power input line 52 through the collector load resistor 76 and between the load resistor 67 and the switch 38. The load resistors 67 and 76 are of the same magnitude with respect to each other. The base 77 of the transistor 62 is connected to the collectors 74 and 75 by a conductor 78. The transistor 58 is one triggering device of the flip-flop circuit 45 and the transistor 64 is the other triggering device in said flip-flop circuit.

The base 79 of the transistor 64 is connected by the conductor 81 to the coupling condenser 84, which is, in turn, connected by the conductor 82 to the primary circuit of the ignition circuit 13. This circuit includes the primary winding 42 of the spark coil 25 and this winding is connected by the conductor 85 to one side of the battery 26 and through the breaker points 86 to the other side of said battery. The breaker points 86 are in a conventional manner mechanically connected to, or are a part of, the distributor 20. The voltage divider or attenuator 44 is placed in the conductor 81 between the transistor 64 and the coupling condenser 84. The divider 44 is comprised of a capacitor 88 and a resistor 89 connected in parallel between the conductor 81 and ground, in a substantially conventional manner.

The output of the flip-flop circuit 45 appears on the conductor 91 and is thence conducted to the amplifier 41. The amplifier 41 includes a transistor 92, the base 93 of which is connected to the conductor 91 through an isolating resistor 94. The base 93 is also connected to ground through a variable bias resistor 95. The collector 96 of the transistor 92 is connected to the power input line 52 through a collector load resistor 97 between the load 76 and the switch 38. The emitter 90 of said transistor 92 is connected to ground. The output of the amplifier 41 passes through conductor 98 to the pole 100 of a double pole, double throw switch 99. The center terminals 101 and 102 of the switch 99 are connected to the meter 11. The meter 11, which may be of the D'Arsonval type or other current measuring instrument, has a damping condenser 103 connected between its terminals. The pole 100a of the switch 99 is connected by a conductor 104 to the power input line 52 through a resistor 105. Said conductor 104 is also connected to ground through the resistor 106. A fixed resistor 107 and a variable resistor 108 are placed in series between the conductors 98 and 104.

The pole 117 of the switch 99 is connected by the conductor 115 to the power input line 52. The pole 117a is connected through a meter multiplier resistance 116 to ground. Thus, when the switch 99 is closed on the poles 100 and 100a, it will connect the conductors 98 and 104 to the meter 11, thereby closing the circuit, including the battery 51, the flip-flop circuit 45, the variable resistor 95, the amplifier 41, the meter 11, conductor 104 and resistance 106, with the variable resistor 108 shunting said meter. When the switch 99 is closed on the poles 117 and 117a, it places the meter 11 in a voltage calibrating circuit, including the resistor 116 and the battery 51.

A variable resistor 118 is placed in the conductor 52 between the conductor 115 and the switch 38. The variable resistor 118, which is shunted by the condenser 119, is controlled externally of the apparatus 10 by some suitable means, such as the knob 120 (Figure 1). In this particular embodiment, the circuit 12 is designed to operate on 2.3 volts, whereas the actual voltage output of the battery 51 may be as high as 4.5 volts. The variable resistor 118 is provided for adjusting the voltage of the circuit 12 to said voltage requirement of the circuit 12.

Operation

Prior to use of the apparatus 10, the signal actuator 16 is arranged for rotation with the crankshaft 18, as by mounting same upon the flywheel 17 of the engine 14. The signal detector 15 is then mounted upon the negine block 29 adjacent to the periphery of the flywheel 17 so that it generates a pulse each time the actuator 16 is moved past the detector 15. Appropriate connections are made as above described and the switch 99 is closed on the poles 117 and 117a and the battery switch 38 is closed. The voltage is adjusted by the resistor 118 to the desired value and the switch 99 is then closed upon the poles 100 and 100a.

The variable resistor 108 is utilized to calibrate the meter 11 for accurate readings of its indicator 111 at the zero point on the meter scale by appropriate adjustment of the screw 112 (Figure 1) on the test apparatus 10, said zero point being at some selected point between the ends of the scale. The variable resistor 95 is used to calibrate the readings of the meter 11 at the "advance" end of the meter scale by appropriate adjustment of the screw 113 on said apparatus 10. By way of example, the meter 11 may be calibrated by manually placing the head of the distributor 20 at 0° of advance with the engine idling and then adjusting the screw 112 until a zero reading is obtained by the indicator 111. Normally, a zero reading on the meter 11 will occur at a predetermined engine condition, such as a relatively low load idling speed of 500 R. P. M. In a similar manner, the distributor head can be manually moved to some angle of advance, such as 50°, with the engine running and the screw 113 adjusted until the indicator 111 reads 50°. The actual angle of advance or retard can also be determined with an apparatus, such as that disclosed in Patent No. 2,715,711. Little, if any, interaction occurs between the two variable resistors so that prompt and accurate calibration can be effected.

The variable resistors 95 and 108 also provide electrical means by which a limited physical displacement of the detector 15 with respect to the actuator 16, when the marks 27 and 28 are properly aligned, can be easily and accurately compensated. A control knob 114 (Figure 1) is provided on the meter 11 for operating the switch 99, also in a conventional manner. The test apparatus is now ready for operation.

When the switch 99 is moved to connection with the terminals 100 and 100a, a potential from the battery 51 will be impressed upon the conductor 52 and the collector loads 67 and 76. As the switch 99 is closed, the bases 77 and 71 of the transistors 62 and 63 will be at ground potential so that no current can flow between the collectors and emitters of these transistors. Thus, as is common in flip-flop circuits, the first one of these transistors which gains control will retain such control until an outside force shifts the control.

Because of the supplemental path provided by the resistances 94 and 95 in series with the load 76, the current through load 67 will be initially less than that through load 76. This comes about because current will initially flow through the load 76, through the collector 74 and the emitter 72 of the transistor 63 and also through the series network comprising the conductor 91 and resistors 94 and 95. Accordingly, the base 71 of the transistor 63 will be made conductive at a more rapid rate, and to a greater extent, than the base 77 of the transistor 62, and less current will then flow through the load 67 through the collector 69, the base 77 and the emitter 66, thereby raising the collector potential of transistor 62 and lowering the collector potential of transistor 63. Thus, any time the circuit 12 is closed by the switch 38, the transistor 63 will tend to seize control of the flip-flop circuit 45, i. e. become more conductive, providing no other electrical forces are imposed upon said flip-flop circuit. This arrangement is not essential, but is desirable because it predetermines the condition of the circuit 12.

It will now be assumed that the engine 14, with which the apparatus 10 is being used, is started. If the switches 38 and 99 are closed, the indicator 111 will move into an energized position, the same being to the right as appearing in Figure 1. The amount of such swing will depend upon the amount of advance or retard to which the distributor 20 is adjusted, and such adjustment is normally dependent upon the engine condition. As a rule, the meter 11 will have a zero reading at idling speed and a maximum advance, as 50°, with a high engine speed. The position of the indicator is electrically dependent upon the current output of the amplifier 41, which is in turn dependent upon the current output of the flip-flop circuit 45. More specifically, the meter 11 reflects the ratio between the time that the flip-flop circuit is producing a relatively high output current and the time between successive initiations of such high outputs. The meter 11, in combination with the damping condenser 103, converts these periodic pulses into a relatively steady reading of the indicator 11, in a conventional manner.

Attention is now directed to the way in which the periodic, relatively high outputs of the flip-flop circuit are created. Because the transistor 63 will normally become conductive between the load 76 and ground when the switch 38 is closed, the transistor 62 will be relatively non-conductive. Thus, a negative potential appearing upon the base 79 of the transistor 64, due to a pulse created within the primary 42, will be insufficient by itself to alter the output from the flip-flop circuit. Such a pulse produced by the primary 42 is transmitted to the base 79 through the conductor 82, the condenser 84, the voltage divider 44, and the conductor 81. Three such pulses occur with each revolution of the six cylinder engine 14.

However, during each revolution of the crankshaft 18, the detector 15 also creates a pulse which passes through the conductor 49, the amplifier 39, the condenser 40 and the conductor 59 to the base 57 of the triggering transistor 58. This pulse creates a momentary current between the base 57 and ground through the emitter 65, whereby the base 57 is made relatively conductive. This creates a relatively high current flow through the load 67 and the transistor 58 with a corresponding drop in current through the load 76. The collector potential of transistors 63 and 64 now becomes more negative and the collector potentials of transistors 58 and 62 simultaneously becomes less negative.

Figure 4:
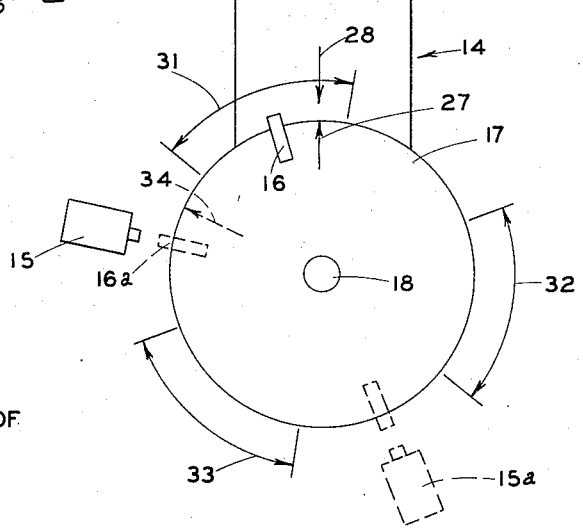
Figure 4 is a wave form illustrating the operation of said circuit.
Figure 4:
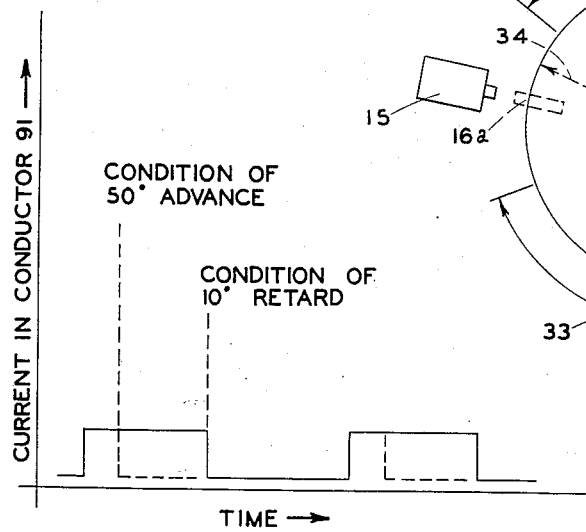

The collector potential appearing at collectors 74 and 75 of transistors 63 and 64 is connected by means of conductor 91 and resistor 94 to the base 93 of transistor 92 in amplifier 41 and the current flow from ground, through emitter 90, base 93, to junction resistor 94 and conductor 91 sharply increases. As shown in Figure 4, the current rise in conductor 91 is sharp and the subsequent flow is steady. This current flow makes the transistor 92 of the amplifier 41 conductive of current between the load 97 and ground. Part of the current through the load 97 will flow through the conductor 98 and the meter 11, as long as the transistor 92 is conductive, and will also charge the condenser 103. This current flow in conductor 91 persists until the output of the flip-flop circuit is again reduced by a pulse from the ignition detector circuit 44.

This last-named pulse impresses a relatively high potential of short duration upon the base of the transistor 64. The appearance of a negative potential at the base of the transistor 64 will trigger the flip-flop circuit 45 in substantially the same manner as described hereinabove with respect to the triggering of the flip-flop circuit by a pulse from the detector 15. Namely, the base 79 of the transistor 64 will be made highly conductive for a moment, whereby the current flowing through the load 76 will be suddenly increased and the current through the load 67 will be correspondingly reduced. This will make the transistor 63 more conductive than the transistor 62, with the result that the collector potential of transistors 63 and 64 will become less negative as the collector potentials of transistors 58 and 62 become more negative. The collector potential decrease at collectors 74 and 75 of transistors 63 and 64 is coupled by means of conductor 91 and resistor 94 to the base 93 of transistor 92 and reduces the current flow through conductor 91 to the static condition.

The current flow through the conductor 91 will decrease almost immediately upon the appearance of the pulse at the base of the transistor 64. As soon as the current flow in the conductor 91 drops below a certain value, the transistor 92 will become relatively non-conductive and the current flow will be negligible through the meter 11. Since the fall of the current in the conductor 91 will be relatively rapid, as indicated in Figure 4, the condenser 103, which was charged during the current flow through the amplifier 41, will now drain through the meter 11 and thereby maintain a relatively steady reading for a given engine condition.

Thus, the pulse created each time the actuator 16 passes the detector 15 will cause the flip-flop circuit 45 to energize the amplifier 41 and the meter 11. A following pulse from the ignition detector circuit created each time the points 86 open and fire a spark plug 19, will cause the flip-flop circuit 45 to terminate such current flow through the amplifier 41 and the meter 11.

Subsequent pulses from the ignition detector circuit in response to the firing circuit 13 will have no effect on the apparatus since no initiating pulse from detector 15 will occur until the next revolution of crankshaft to reenergize the flip-flop, or triggering, circuit.

As is customary in ignition timing circuits, the distributor will maintain some desired relationship between the firing of the spark plug and the arrival of the corresponding piston into a predetermined position, such as top dead center, depending, for example, upon the engine speed and load. Since the occurrence of the detector pulses is fixed by the mechanical positioning of the detector 15 and the actuator 16, an increase in the advance will produce a corresponding reduction in the ratio of the time between a detector pulse and the first succeeding spark pulse, and the time between successive detector pulses. The ratio between the duration of current flow from the amplifier 41 and the time interval between successive initiations of such flow will correspond directly to said pulse ratio.

The detector pulse is intentionally caused to occur out of the firing range of the spark plugs so that some current flow will under any timing conditions be assured. As described above, the meter 11 can be easily and quickly calibrated by means of the variable resistors 95 and 108. The variable resistor 108 will set the zero reading of the indicator 111 and the variable resistor 95 will set the high advance reading of the indicator 111.

The circuit 12 is connected to the spark coil primary 42 in this particular embodiment in order to avoid the high voltage of the spark coil secondary. However, the secondary of said coil 25 could be used as the source of the spark pulse, if desired, or an inductive pick-up from one of the spark plug cables could be used. In such latter case, the placement of the detector 15 and the actuator 16 would not be as limited because then there would be only one spark pulse with each two revolutions of the engine crankshaft 18. In any case where the secondary circuit is so used, it will preferably be connected to the input conductor 82 of the sensing circuit 44 and the detector 15 remains connected as before.

In view of the foregoing, it will be evident that the specific arrangement of the detector circuits here utilized to illustrate the invention can be reversed and the pulse increasing flow through the conductor 91 can be responsive to the ignition circuit and the pulse reducing the flow in conductor 91 can be responsive to the mechanical detector circuit.

Further, it is possible to permit repeated pulses tending to initiate a pulse on conductor 91 followed by a terminating pulse, or other pulse patterns, provided only that the pattern is cyclic and repetitive and the meter 11 calibrated accordingly.

Because of the existence of the variable resistors 95 and 108, it is not necessary that the installation of the detector 15 and actuator 16 be precisely accurate. In other words, knowledge of the exact angular distance between the timing mark 27 and the reference mark 28 at the moment that the detector is actuated by the actuator 16 is not necessary, providing only that the timing mark is pointing in a radial direction which does not intersect one of the firing ranges 31, 32 and 33 when the detector unit is caused by the actuator 16 to create a pulse. As long as the installer knows approximately the angular distance between the timing mark and the reference mark when the detector is actuated by the actuator, the final and accurate adjustment can be controlled and compensated by means of the variable resistors 95 and 108. In presently known devices of this general type it is essential that the detector pulse occur when some known point associated with the crankshaft 18, such as the timing mark 27 on the flywheel 17, is at some accurately determined angular distance from a selected point on the engine block 29, such as the reference mark 28. It is also essential in present devices that the piston, which is associated with the next spark plug fired after a given detector pulse, be exactly in some known position, such as top dead center, when the timing mark 27 is aligned with the reference mark 28. To effect an accurate installation under these circumstances of inflexibility is difficult at best. The variable resistors 95 and 108 in the present device make such accuracy of installation unnecessary.

Although a particular, preferred embodiment of this invention has been disclosed hereinabove for illustrative purposes, it will be understood that variations or modifications thereof which do not depart from such disclosure are fully contemplated unless specifically stated to the contrary in the appended claims.

I claim:
1. In an electrical circuit for monitoring the ignition system of an internal combustion engine having a rotatable element thereon, the combination comprising: a pair of detector circuits, one of said detector circuits being adapted to transmit a pulse in response to movement of said rotatable element through a predetermined position and the other of said detector circuits being adapted to transmit a pulse corresponding to an ignition pulse in said ignition system; a triggering circuit having a pair of input terminals and an output terminal; means connecting the detector circuits to the input terminals of said triggering circuit, said triggering circuit being adapted to transmit an energy output in response to a pulse from one of said detector circuits, said energy output being changed when a pulse from the other detector circuit is applied to said triggering circuit; a transistor having a base, an emitter and a collector; means connecting said base to the output terminal of said triggering circuit; means connecting said emitter to ground; means connecting said collector through a load resistance to a source of potential; a meter; means connecting said collector to one terminal of said meter and means connecting the other terminal of said meter to a voltage divider and thence to said source whereby said meter will provide a steady indication determined by the ratio existing between the time representing the duration of one of successive energy outputs from said triggering circuit and the time between the beginning of successive pulses of output energy therefrom.

2. A circuit according to claim 1 including an adjustable resistance connected between said base and ground; a second adjustable resistance and means connecting same between the terminals of said meter.

3. In an electrical circuit for monitoring the ignition system of an internal combustion engine having a rotatable element thereon, the combination comprising; a pair of detector circuits, one of said detector circuits being adapted to transmit a pulse in response to movement of said rotatable element through a predetermined position and the other of said detector circuits being adapted to transmit a pulse corresponding to an ignition pulse in said ignition system; a transistor having a base, a collector and an emitter, means connecting one of said detector circuits to the base of said transistor; means connecting said collector through a load resistor to a source of potential; means connecting said emitter to ground; a triggering circuit having a pair of input terminals and an output terminal; means connecting the other detector circuit to one input terminal and means connecting said collector to the other input terminal, said triggering circuit being adapted to transmit an energy output in response to a pulse from one of said detector circuits, said energy output being changed when a pulse from the other detector circuit is applied to said triggering circuit; a transistor having a base, an emitter and a collector; means connecting said base to the output terminal of said triggering circuit; means connecting said emitter to ground; means connecting said collector through a load resistance to a source of constant potential; a meter; means connecting said collector to one terminal of said meter and means connecting the other terminal of said meter to a voltage divider and thence to said source whereby said meter will provide a steady indication determined by the ratio existing between the time representing the duration and energy output of one value from said triggering circuit and the time between the beginning of successive energy outputs of said one value.

4. In an electrical circuit for monitoring the ignition system of an internal combustion engine having a rotatable element thereon, the combination comprising: a pair of detector circuits, one of said detector circuits being adapted to transmit a pulse in response to movement of said rotatable element through a predetermined position and the other of said detector circuits being adapted to transmit a pulse corresponding to an ignition pulse in said ignition system; a triggering circuit, said triggering circuit including first and second parallel connected transistors connected in series through a load resistance to a source of potential; third and fourth parallel connected transistors connected in series through a second load resistance to said source; means connecting the emitters of said transistors to ground; means connecting the collectors of said first and second transistors to a first junction point and means connecting the collectors of said third and fourth transistors to a second junction point; means connecting said first junction point to the base of said third transistor and means connecting said second junction point to the base of said second transistor; means connecting said detector circuits to the base of said first and fourth transistors, respectively; an output terminal of said triggering circuit, said triggering circuit being adapted to transmit an energy output in response to a pulse from one of said detector circuits, said energy output being changed when a pulse from the other detector circuit is applied to said triggering circuit; an amplifying transistor having a base, an emitter and a collector; means connecting said base to the output terminal of said triggering circuit; means connecting said emitter to ground; means connecting said collector through a load resistance to a source of constant potential; a meter; means connecting said collector to one terminal of said meter and means connecting the other terminal of said meter to a voltage divider and thence to said source whereby said meter will provide a steady indication determined by the ratio existing between the time representing the duration of one value of output energy from said triggering circuit and the time between the beginning of successive pulses of output energy of said one value.

5. In an electrical circuit for monitoring the ignition system of an internal combustion engine having a rotatable element thereon, the combination comprising: a pair of detector circuits, one of said detector circuits being adapted to transmit a pulse in response to movement of said rotatable element through a predetermined position and the other of said detector circuits being adapted to transmit a pulse corresponding to an ignition pulse in said ignition system; an amplifying transistor having a base, a collector and an emitter; means connecting one of said detector circuits to said base; means connecting the collector through a load resistance to a source of potential; means connecting said emitter to ground; a triggering circuit, said triggering circuit including first and second parallel connected transistors connected in series through a load resistance to said source of potential, third and fourth parallel connected transistors connected in series through a second load resistance to said source; means connecting the emitters of said transistors to ground; means connecting the collectors of said first and second transistors to a first junction point and means connecting the collectors of said third and fourth transistors to a second junction point; means connecting said first junction point to the base of said third transistor and means connecting said second junction point to the base of said second transistor; means including a capacitor connecting the collector of said amplifying transistor to the base of said first transistor; means connecting the other detector circuit to the base of said fourth transistor; a second amplifying transistor having a base, an emitter and a collector; means connecting the base of said second amplifying transistor to the output terminal of said triggering circuit; an adjustable resistance connected between the base of said second amplifying transistor and ground; means connecting the emitter of said second amplifying transistor to ground; means connecting the collector of said second amplifying transistor through a load resistance to a source of constant potential; a meter; a second adjustable resistance and means connecting same between the terminals of said meter; means connecting said collector of said second amplifying transistor to one terminal of said meter and means connecting the other terminal of said meter to a voltage divider and thence to said source whereby said meter will provide a steady indication determined by the ratio existing between the time representing the duration of one value of output energy from said triggering circuit and the time between the beginning of successive pulses of output energy of said one value.

6. In an electrical circuit for monitoring the ignition system of an internal combustion engine having a rotatable element thereon, the combination comprising: a pair of detector circuits, one of said detector circuits being adapted to transmit a pulse in response to movement of said rotatable element through a predetermined position and the other of said detector circuits being adapted to transmit a pulse corresponding to an ignition pulse in said ignition system; a triggering circuit having a pair of input terminals and an output terminal; means connecting the detector circuits to the input terminals of said triggering circuit, said triggering circuit being adapted to transmit an energy output in response to a pulse from one of said detector circuits, said energy output being changed when a pulse from the other detector circuit is applied to said triggering circuit; an amplifier circuit having control means connected to the output terminal of said triggering circuit; means including an adjustable resistance connecting said control means to ground, said last-named means also being connected to said triggering circuit for controlling the conductivity thereof; means connecting the output element of said amplifier to a source of potential; a meter; means connecting said output element to one terminal of said meter; means including an adjustable resistance connecting said output element to the other terminal of said meter; and means connecting said other terminal to a voltage divider and thence to said source of potential whereby said meter will provide a steady indication determined by the ratio existing between the time representing the duration of output energy of one value from said triggering circuit and the time between the beginning of successive pulses of output energy of said one value.

References Cited in the file of this patent

UNITED STATES PATENTS

| | | |
|---|---|---|
| 2,263,859 | Eldredge | Nov. 25, 1941 |
| 2,735,296 | Traver | Feb. 21, 1956 |

OTHER REFERENCES

"Directly Coupled Transistor Circuits," Beter et al., Elecetronics, June 1955, pp. 132-136.